(12) United States Patent
Moustafa et al.

(10) Patent No.: US 10,165,028 B2
(45) Date of Patent: Dec. 25, 2018

(54) CONTEXT-AWARE STREAMING OF DIGITAL CONTENT

(71) Applicant: INTEL CORPORATION, Santa Clara, CA (US)

(72) Inventors: Hassnaa Moustafa, Portland, OR (US); Barry A. O'Mahony, Banks, OR (US); Jeffrey R. Foerster, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 806 days.

(21) Appl. No.: 14/224,514

(22) Filed: Mar. 25, 2014

(65) Prior Publication Data

US 2015/0281299 A1 Oct. 1, 2015

(51) Int. Cl.
*H04L 29/06* (2006.01)
*H04N 21/854* (2011.01)
(Continued)

(52) U.S. Cl.
CPC .......... *H04L 65/60* (2013.01); *H04L 65/4084* (2013.01); *H04L 65/605* (2013.01);
(Continued)

(58) Field of Classification Search
CPC . H04L 65/4084; H04L 65/601; H04L 65/605; H04L 65/60; H04L 65/608; H04L 65/80; H04L 67/02; H04L 67/42; H04N 21/4621; H04N 21/64792; H04N 21/26258; H04N 21/6377; H04N 21/64322; H04N 21/8456; H04N 21/85406
USPC ........................................................ 709/219
See application file for complete search history.

(56) References Cited

U.S. PATENT DOCUMENTS 6,714,778 B2   3/2004   Nykanen et al.
8,543,925 B2   9/2013   Weitz et al.
(Continued)

FOREIGN PATENT DOCUMENTS

WO   02093877 A1   11/2002
WO   2012134530 A1   10/2012
(Continued)

OTHER PUBLICATIONS

Extended European Search report in European Patent Application 15154563.9 (dated Aug. 19, 2015).
(Continued)

*Primary Examiner* — Tonia L Dollinger
*Assistant Examiner* — Adam A Cooney
(74) *Attorney, Agent, or Firm* — Finch & Maloney PLLC

(57) ABSTRACT

Techniques are disclosed for streaming digital content from a server to a client device in a way that is tailored to the context in which the client device is used. The context in which a client device is used may refer to, for example, the operational characteristics of the device and/or the environmental conditions under which the device is used. A client device can be configured to collect contextual data characterizing its use context. The way in which streaming media is delivered to the client device can be adjusted based on such contextual data, and in particular, can be adjusted in a way that tailors the content delivery to the specific use context. This can improve user experience and conserve battery and network resources, for example, by avoiding the streaming of high definition content to a device that, due to its use context, is able to render standard definition content.

24 Claims, 8 Drawing Sheets

(51) Int. Cl.
  *H04N 21/647* (2011.01)
  *H04N 21/643* (2011.01)
  *H04N 21/6377* (2011.01)
  *H04N 21/462* (2011.01)
  *H04N 21/262* (2011.01)
  *H04N 21/845* (2011.01)
  *H04L 29/08* (2006.01)

(52) U.S. Cl.
  CPC ............ *H04L 65/608* (2013.01); *H04L 65/80* (2013.01); *H04L 67/02* (2013.01); *H04L 67/42* (2013.01); *H04N 21/26258* (2013.01); *H04N 21/4621* (2013.01); *H04N 21/6377* (2013.01); *H04N 21/64322* (2013.01); *H04N 21/64792* (2013.01); *H04N 21/8456* (2013.01); *H04N 21/85406* (2013.01)

(56) References Cited

U.S. PATENT DOCUMENTS

| | | | |
|---|---|---|---|
| 8,645,562 B2 | 2/2014 | Thang | |
| 9,357,272 B2 | 5/2016 | Oyman | |
| 2009/0282162 A1* | 11/2009 | Mehrotra | H04L 65/607 709/233 |
| 2012/0324490 A1* | 12/2012 | Hwang | H04N 21/2393 725/9 |
| 2013/0007814 A1 | 1/2013 | Cherian et al. | |
| 2013/0195204 A1* | 8/2013 | Reznik | H04N 19/85 375/240.26 |
| 2013/0271452 A1 | 10/2013 | Kumar et al. | |
| 2013/0275557 A1* | 10/2013 | Myers | H04N 21/2221 709/219 |
| 2013/0290493 A1* | 10/2013 | Oyman | H04W 72/0413 709/219 |
| 2014/0241415 A1* | 8/2014 | Su | H04N 19/142 375/240.02 |

FOREIGN PATENT DOCUMENTS

| | | |
|---|---|---|
| WO | 2013003793 A1 | 1/2013 |
| WO | 2013109941 A | 7/2013 |
| WO | 2013109941 A2 | 7/2013 |

OTHER PUBLICATIONS

Search Report of R.O.C. Patent Application No. 104102718, completed May 16, 2016.

* cited by examiner

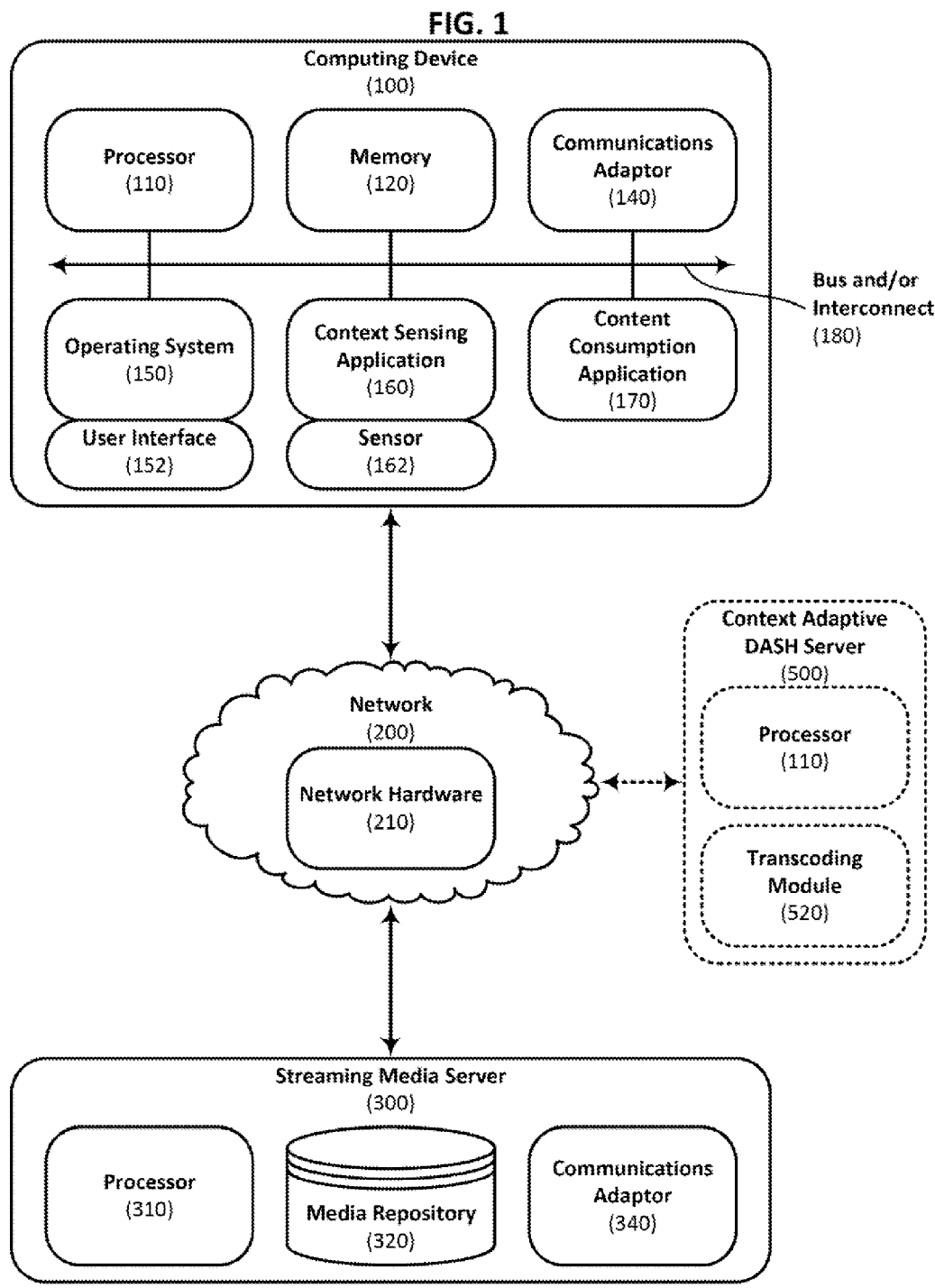

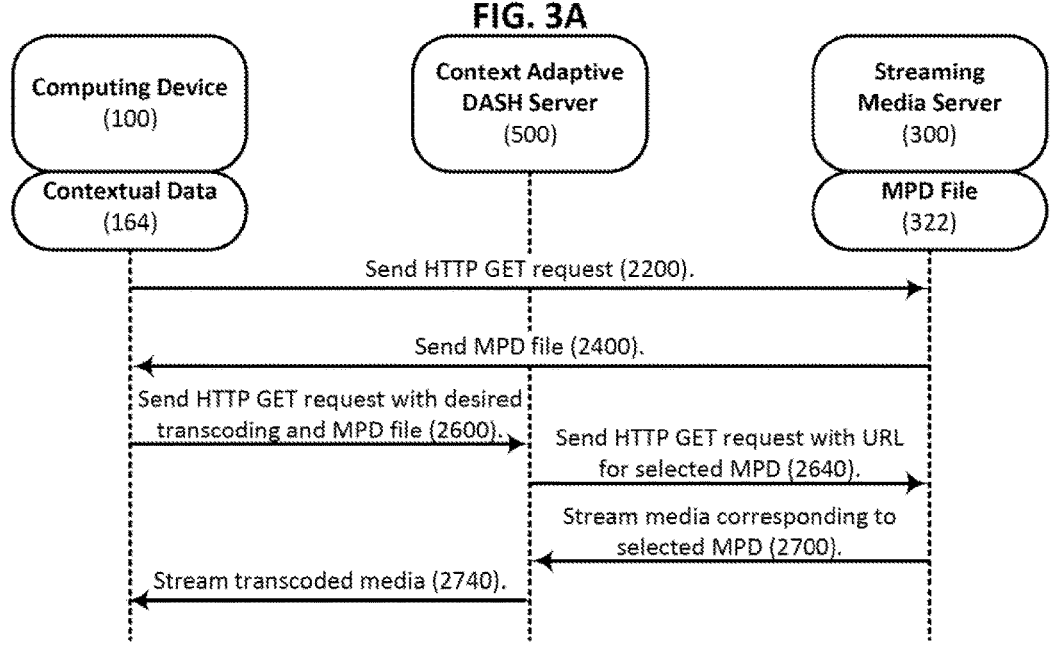

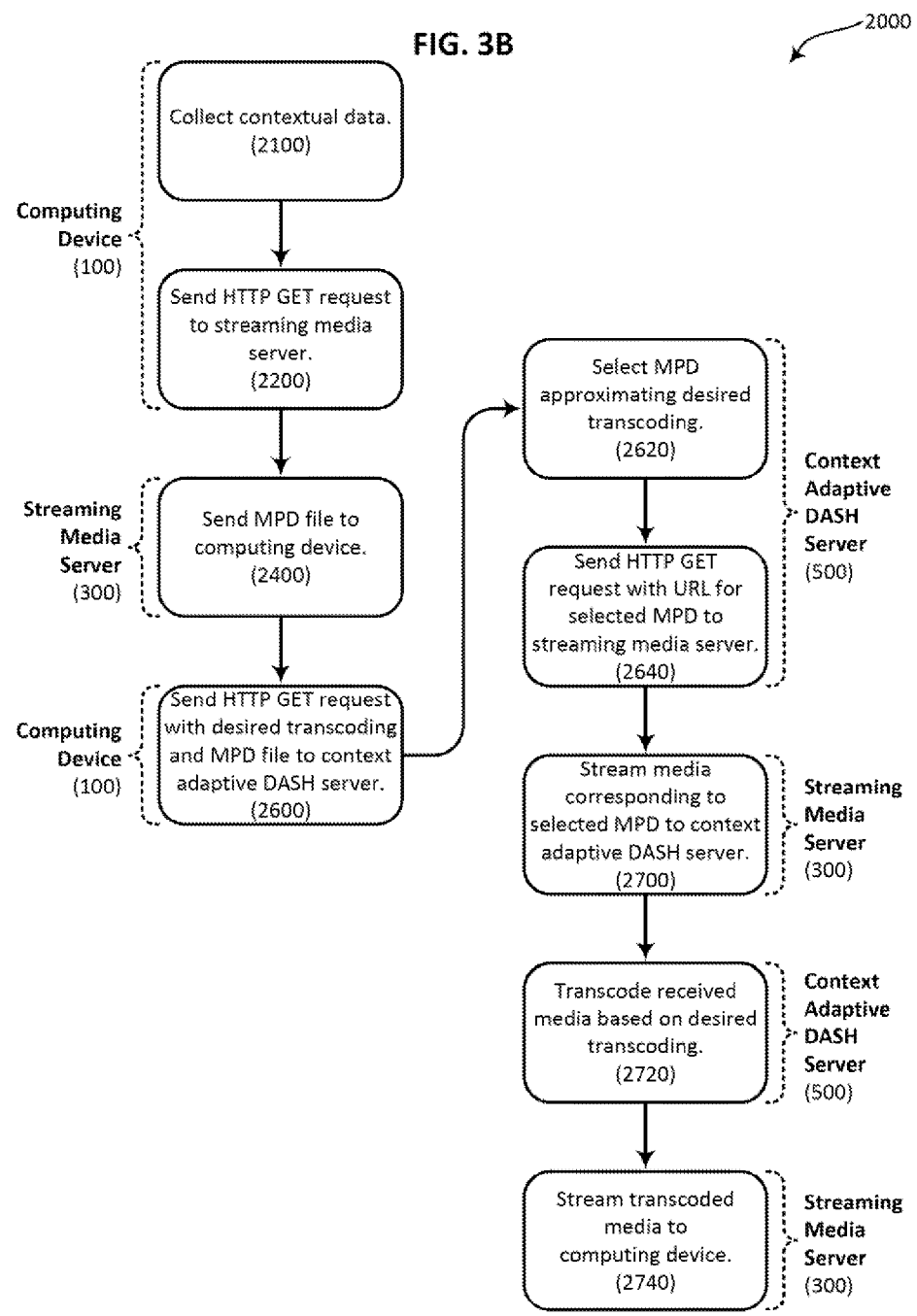

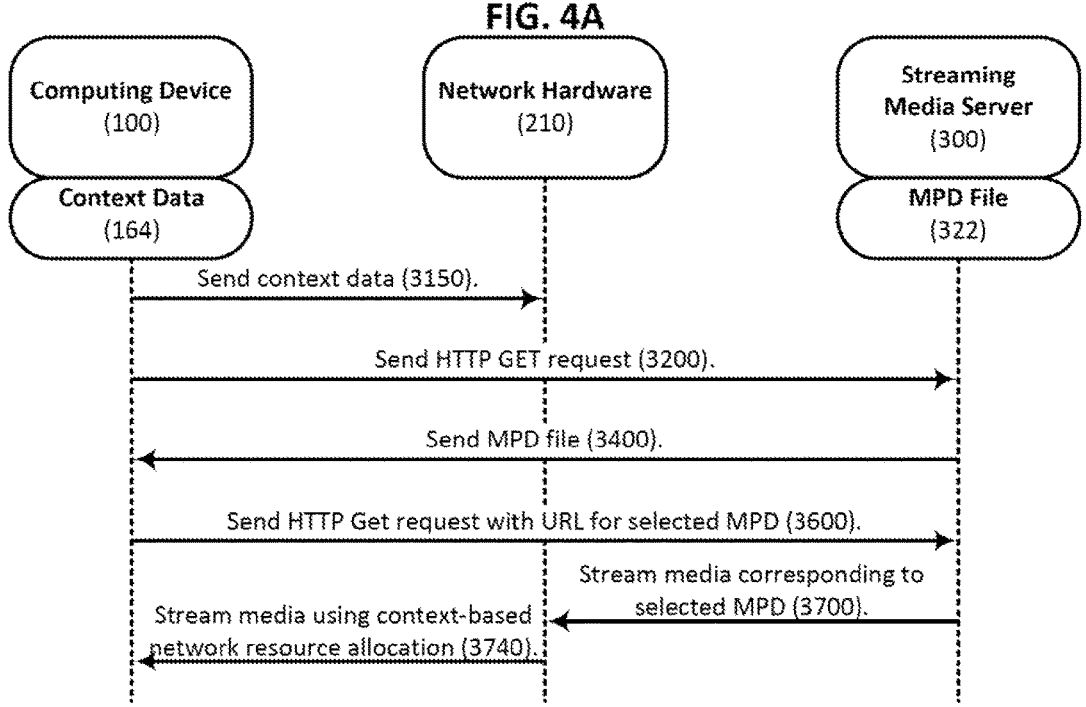

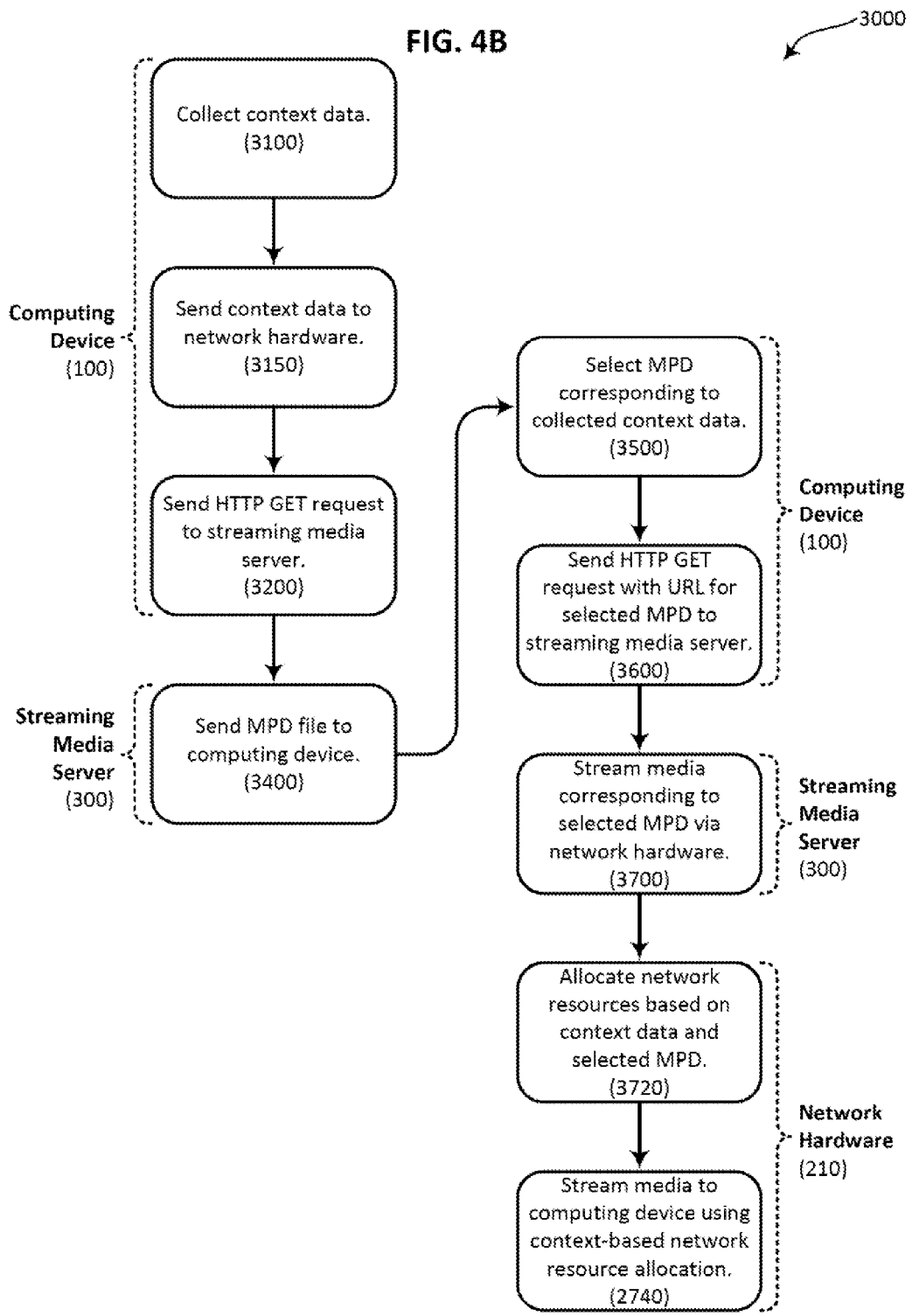

US 10,165,028 B2

CONTEXT-AWARE STREAMING OF DIGITAL CONTENT

BACKGROUND

As mobile computing devices like smartphones and tablet computers become increasingly ubiquitous, consumers are demanding greater performance and a wider range of functionality from these devices. As a result, the cellular data and wireless networks to which mobile devices are often connected have seen a corresponding increase in demand for the number of simultaneous connections and the volume of data traffic that should be handled. These growing demands have led to the development of technologies intended to improve data transmission efficiency using the hypertext transfer protocol (HTTP) which serves as the foundation for a substantial portion of server-client communication across the World Wide Web. One example of such a technology is dynamic adaptive streaming over HTTP (DASH). DASH is an adaptive bitrate streaming technique that enables high quality streaming of media content from an HTTP server. Using DASH, content that is to be delivered to a networked device can be downloaded form a server at a variety of different bitrates. For each segment of content that a client requests from the server, the client automatically requests that the segment be downloaded at the highest bitrate possible, based on the available network bandwidth, without causing the media stream to stall or re-buffer. Thus DASH can adapt to changing network conditions while still maintaining a relatively high quality playback experience for the client.

BRIEF DESCRIPTION OF THE DRAWINGS

FIG. 1 is a block diagram schematically illustrating selected components of a system that can be used to provide context-aware streaming of digital content in accordance with certain of the embodiments disclosed herein.

FIG. 3A is a data flow diagram schematically illustrating how digital content can be streamed from a media server, via a context adaptive DASH server, to a client computing device in a way that is tailored to the context in which the client computing device is used, in accordance with certain of the embodiments disclosed herein.

FIG. 3B is a flowchart illustrating a method for streaming digital content from a media server, via a context adaptive DASH server, to a client computing device in a way that is tailored to the context in which the client computing device is used, in accordance with certain of the embodiments disclosed herein.

FIG. 4A is a data flow diagram schematically illustrating how the streaming of digital content from a media server to a client computing device can be tailored by intermediate network hardware based on the context in which the client computing device is used, in accordance with certain of the embodiments disclosed herein.

FIG. 4B is a flowchart illustrating a method for using network hardware to tailor the streaming of digital content from a media server to a client computing device based on the context in which the client computing device is used, in accordance with certain of the embodiments disclosed herein.

DETAILED DESCRIPTION

Figure 2A:
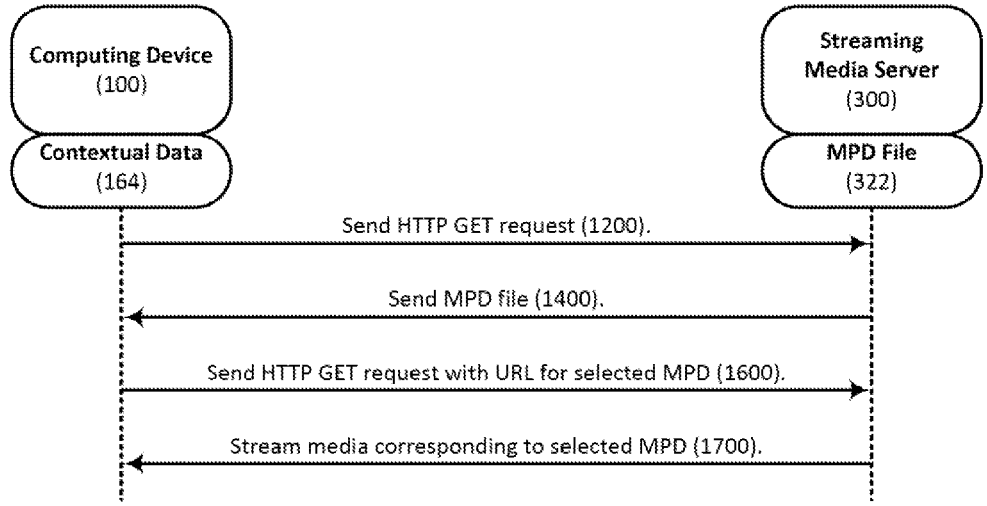
FIG. 2A is a data flow diagram schematically illustrating how digital content can be streamed from a media server to a client computing device in a way that is tailored to the context in which the client computing device is used, in accordance with certain of the embodiments disclosed herein.

Techniques are disclosed herein for streaming digital content from a server to a client device in a way that is tailored to the context in which the client device is used. The context in which a client device is used may refer to, for example, the operational characteristics of the device and/or the environmental conditions under which the device is used. In certain embodiments a client device can be configured to collect data characterizing the context in which it is used. Examples of such contextual data include a display resolution associated with the device, a processing capacity associated with the device, data characterizing the physical environment in which the device is being used (such as ambient light levels, ambient noise levels and/or physical vibration levels), user configuration settings saved on or otherwise associated with the device, and battery power available to the device. The way in which streaming media is delivered to the client device can be adjusted based on such contextual data, and in particular, can be adjusted in a way that tailors the content delivery to the specific context in which the client device is used. This can improve user experience and conserve battery and network resources, for example, by avoiding the streaming of high definition content to a device that, due to its use context, is able to render only standard definition content. Thus certain of the techniques disclosed herein are useful in making content delivery more efficient, particularly in conjunction with congested networks that have limited bandwidth for streaming media. Certain of the techniques disclosed herein are also useful in improving user experience for devices being used in a context that is unsuitable for the highest bitrate possible that may be delivered by a conventional DASH server. Numerous embodiments will be apparent in light of this disclosure.

As used herein, the "context" in which content is consumed by a user refers, in addition to its ordinary meaning, to the situation of a user, a place, or an object that is relevant to the user's consumption of content. This includes the user himself/herself, the networks used to transmit the content to the device, the software or hardware used to view the content, and the content itself. Thus context will be understood as encompassing multiple functional domains, including end users, network and service providers, and content providers. In general, context may be static (as in the case of the resolution of an integrated display) or dynamic (as in the case of transient network conditions). The examples of different use contexts provided in this disclosure are not limiting, and thus in other embodiments other characteristics may be encompassed within the term context. Data that characterizes the context in which content is consumed is referred to herein as "contextual data".

Thus, with respect an end user, the term "context" refers to the environmental, physical, and/or situational conditions under which the user consumes content, and thus encompasses, for example, ambient light levels, ambient noise levels, geographic location, external temperature, physical movement, and/or physical vibration. Context also encompasses operational characteristics associated with a user and/or a user device, such as user profile and configuration settings, device processing capacity, device memory capacity, device battery characteristics including remaining battery power and battery drain rate, resolution and size of a display controlled by a device, and/or the presence or absence of other applications running on a device. Context also refers to how a user consumes content, such as by focusing his/her eyes only on a limited portion of the display or on a particular object shown in the display. With respect to network and service providers, the term "context" refers to operational characteristics of a network or service provider used to transmit the content from server to client. This includes, for example, available network bandwidth, the network type (for example, cellular, wireless local area network or other), the power-bandwidth tradeoff for a network, and/or the number of existing connections being serviced by a network. With respect to content providers, the term "context" encompasses factors such as how the content is encoded, the bitrate at which the content is encoded, and the type of content (such as user-generated content, video or telephone conferencing content, professionally produced motion picture content, sports content, newscast content, or some other type of content).

As used herein, the term "content" refers, in addition to its ordinary meaning, to information intended for direct or indirect consumption by a user. For example, the term content encompasses information directly consumed by a user such by displaying the content on a display device or playing the content using an audio speaker. The term content also includes information that is not specifically intended for display, and therefore also encompasses items such as software, executable instructions, mobile applications, scripts, hyperlinks, addresses, pointers, metadata, and formatting information. The use of the term content is independent of (a) how the content is presented to the user for consumption and (b) the particular software application used to create and/or render the content. Content may be encoded using one or more compression algorithms intended to reduce the amount of bandwidth required for transmission of the content via a network. Certain compression algorithms, such as some of those established by the Motion Picture Experts Group (MPEG) enable content to be encoded at a variety of different bitrates, or at varying bitrates, which may be particularly useful with respect to DASH techniques. The term "digital content" refers to content which is encoded in binary digits (for example, zeroes and ones); for applications involving digital computers, the terms "content" and "digital content" are often used interchangeably. The term "streaming content" refers that content which is transmitted from one computing device to another, such as in the case of delivery from a server to a client device in a client-server computing environment.

General Overview

While DASH techniques have enabled content streaming to adapt to changing network conditions, such techniques lack the ability to respond to anything other than what the client device perceives as the highest bitrate that can be transmitted through a given channel at a given time. However there are numerous situations where it may be desirable to modify how content is streamed based on other considerations. For example, where a mobile device has limited battery power available, a user may wish to stream video content at a lower bitrate in an effort to prolong battery life and stream as much content as possible before the battery power is completely exhausted. Or where a user is watching streaming video content on a smartphone while walking, riding on a crowded subway, or engaging in any other activity where his/her perception ability may be diminished, it may be unnecessary or undesirable to consume the bandwidth, processing capacity, and/or power resources necessary to process and display a high definition video stream. Thus certain of the embodiments disclosed herein provide digital content streaming techniques which are aware of and responsive to a variety of contexts in which content may be streamed to a client device. Information that characterizes the context in which content is consumed may be derived from a variety of sources, including client-side applications capable of sensing a use environment, server-side software capable of performing network traffic analysis, and/or edge routers capable of analyzing network conditions.

Providing a content stream which is aware of, and responsive to, the context in which the content is ultimately consumed by an end user provides a number of advantages with respect to existing content streaming techniques. For instance, mobile devices in particular are susceptible to constraints such as limited battery power, weak or transient network signal reception, and limited display resolution. Providing content that is specifically adapted for the display on which it is to be consumed also reduces the likelihood that video artifacts are observed. Mobile devices are also often used in environments where a user may not be able to devote full attention to rendered content. Tailoring the streaming of content to specific use contexts enables network and device resources to be allocated and used more efficiently, thereby enhancing user overall experience. Thus in certain embodiments a detected use context is used to modify not only the operation of the user's device itself, but also the transmission protocol that defines how content is streamed to the device.

In the context of video content streamed to a mobile computing device such as a smartphone, such tailoring may include adapting the video content in a way that enhances an end user's experience in watching the video while still optimizing available network resources and client device power consumption. In general, streaming content can be tailored using any of a variety of suitable techniques, such as by switching between unicast and multicast broadcasting, modifying network coding to adjust bandwidth, selecting server or transmission network resources that are particularly well-suited for a given context, or selecting content encoded at a particular bitrate. Thus certain of the embodiments disclosed herein provide for differentiation of content streaming services based on the context in which the content is ultimately consumed by an end user, thereby providing a more user-centric and richer content consumption experience.

Certain of the embodiments disclosed herein involve tailoring how content is provided to a single device based on the context in which that device is used. For example, in one such embodiment a mobile device is provided with hardware and/or software capable of sensing how much battery power is available to the device. If a user of the device receives streaming content when the remaining battery power is above a predetermined threshold, the device can be configured to request that high definition content be streamed from a media server. However, if the remaining battery power falls below the threshold, the device can be configured to request that only an audio portion of the content be streamed from the media server. Streaming audio as opposed to high definition video reduces the amount of power drawn from the battery, for example by reducing processing requirements and allowing the display to be dimmed or turned off entirely. Such a configuration would allow the user to delay the point at which the battery power is exhausted completely and thereby increase the amount of content that can be streamed to the device.

In another embodiment a content consumption device such as a high definition television is provided with or coupled to hardware and/or software capable of sensing a location on the display where a user is focusing his/her gaze. The corresponding contextual data produced by such hardware and/or software can be used to reduce bandwidth by, for example, reducing video quality when the user looks away from the display. Bandwidth use could also be moderated by, for example, only rendering high definition content in a region of the display where the user's eyes are focused. Such modifications are particularly useful in applications where, for instance, the available bandwidth is constrained for some reason, or the television is being controlled by a device with limited processing capacity, such that full-screen rendering of high definition content is outside the capabilities of the controlling device.

Other embodiments involve tailoring how content is provided to multiple devices based on the context of the multiple devices. For example, a user may have access to multiple devices having different use contexts, such as (a) a tablet computer with flagging battery power and/or a fading wireless network signal and (b) a smartphone with full battery power and/or a strong 3G cellular data signal. These devices can be preregistered as alternative content consumption devices associated with the user. A coordinated determination can be made with respect to which of the devices is better suited to receive a media stream at a given time based on the particular contexts of the alternative devices. Thus a user who requests content to be streamed to the tablet computer, not realizing its contextual limitations and the more preferable context of the alternative smartphone, may be presented with a notification suggesting that the content stream instead be provided to the smartphone. This would eliminate any need for the user to be aware of which of his/her alternative devices is better suited to receive a content stream at a given time.

In certain embodiments a predefined user profile can be used in conjunction with contextual data that is collected in real-time to provide a degree of personalization not available using existing content streaming techniques. For instance, a user profile may include information about a user's house and the various ways the user may consume content within different portions of the house. Such information may include the fact that a user has a high definition big screen television in the parlor, a standard definition compact flat panel display in the kitchen, and an audio system in the bedroom. Video or other sensors can be used to detect the user's movement from one location to another and to adjust how content is streamed based on the user's location at a given time. For example, when a user watching high definition video in the parlor moves to the kitchen, the content stream can be automatically switched from a high definition stream to a standard definition stream, thereby conserving network resources without diminishing user experience. When the user later moves to the bedroom, the content stream can be automatically switched from the standard definition video stream to an audio-only stream. Aside from allowing network and device resources to be allocated more efficiently, this illustrates how context and user profile information can also be used to provide a multiscreen content consumption experience that increases user connection time while decreasing time spent managing different connections to different devices.

A predefined user profile can also be used to enhance a user's content consumption experience outside the home. For example, the user's profile can define preferred content language or type, such that when the user is visiting another region, content in either a local language or in a home language is streamed depending on the user's preference. Likewise, user preferences with respect to how content characteristics (such as resolution, brightness and/or luminosity) are affected by context (such as ambient light, ambient noise and/or movement) can follow the user. Thus, for example, a user consuming content on a high definition television screen in a hotel room with soft ambient lighting can have the luminosity of the content moderated in the same way it would be moderated in his/her living room, thereby providing a more customized user experience and/or reducing the streaming bandwidth. Or a user consuming content on a smartphone while commuting on a crowded subway can have the bitrate of streamed video content moderated to save battery power since reduced video quality would likely be unnoticed in such a use context. Thus the tailoring of streamed content may depend on a user's perceived quality of the content rather than the actual quality of content that the device is capable of rendering. Tailoring of streamed content may at least partially depend on user-defined preferences, such as a preference for lower bitrates when connected to a cellular data network in an effort to avoid excessive data charges from being incurred.

The streamed content can also be modified based on the user's geographic location and/or movement. For example, a user who must pass a border checkpoint on his commute may configure his profile such that content providing border wait times is streamed when the user moves within a certain distance of the checkpoint. Or a user watching streamed video content on a smartphone during her evening commute may configure her profile to maximize the quality of the streamed content while avoiding battery expiration prior to arrival home. This could be accomplished by moderating streaming bandwidth based on the available battery power on the smartphone and the length of the remaining commute. Other user profile customizations intended to enhance the quality of the user's experience may be implemented in other embodiments.

System Architecture

FIG. 1 is a block diagram schematically illustrating selected components of a system that can be used to provide context-aware streaming of digital content. More specifically, FIG. 1 illustrates a computing device 100 configured to collect contextual data and use such data to interact with a streaming media server 300 in a way that allows media to be delivered from server 300 to computing device 100 in an efficient and context-sensitive manner. In such embodiments, computing device 100, streaming media server 300 and an optional context adaptive DASH server 500 can communicate with each other via network 200. Additional or alternative resources and components may be provided in other embodiments. Such other resources and components may be integrated into and provided by one or more of computing device 100, streaming media server 300, or context adaptive DASH server 500, as will be described in turn. Thus other embodiments may have fewer or more networked resources and/or components depending on the granularity of implementation. In addition, while only one computing device 100 and one streaming media server 300 are illustrated in the example embodiment of FIG. 1, it will be appreciated that, in general, the system may comprise a distributed network of tens, hundreds, thousands, or more servers 300 capable of interacting with an even larger number of computing devices 100. It will therefore be appreciated that this disclosure is not intended to be limited to provision or exclusion of any particular resources and/or components, or to any particular number of client or server devices connected to network 200.

Computing device 100 can comprise any of a variety of computing devices that are suitable for interaction with, and consumption of content provided by, streaming media server 300. Thus in certain embodiments computing device 100 may comprise a device such as a handheld computer, a cellular telephone, a tablet computer, a smartphone, a laptop computer, a desktop computer, a networked stereo or multimedia system, a digital media player, or a set-top box. Other devices can be used in other embodiments. Computing device 100 includes one or more software modules configured to implement certain of the functionalities disclosed herein, as well as suitable hardware configured to enable such implementation. In such embodiments these modules and accompanying hardware may include, but are not limited to, a processor 110, a memory 120, a communications adaptor 140, an operating system 150, a context sensing application 160, and a content consumption application 170. A bus and/or interconnect 180 may also be provided to allow for inter- and intra-device communications using, for example, communications adaptor 140.

Processor 110 can be any suitable processor, and may include one or more coprocessors or controllers, such as an audio processor or a graphics processing unit (GPU), to assist in processing operations of computing device 100. Memory 120 can be implemented using any suitable type of digital storage, such as one or more of a disk drive, a universal serial bus (USB) drive, flash memory, and/or random access memory. Communications adaptor 140 can be any suitable network chip or chipset which allows for wired and/or wireless communication with network 200 and any of the other components described herein. Operating system 150 may comprise any suitable operating system, such as Google Android (Google Inc., Mountain View, Calif.), Microsoft Windows (Microsoft Corp., Redmond, Wash.), or Apple OS X (Apple Inc., Cupertino, Calif.). In certain embodiments operating system 150 is configured to provide an interactive user interface 152 that is capable of displaying information and/or content to, and receiving input from, a user. As will be appreciated in light of this disclosure, the techniques provided herein can be implemented without regard to the particular operating system provided in conjunction with computing device 100, and therefore may also be implemented using any suitable existing or subsequently-developed platform.

As described herein, computing device 100 may comprise software such as context sensing application 160 and content consumption application 170. Context sensing application 160 can be configured to collect contextual data and characterize the context in which computing device 100 is used for content consumption. Such characterization may result in the generation of contextual data which may be used as described herein. For example, in certain embodiments context sensing application 160 can be configured to work in conjunction with content consumption application 170, such that initialization or other use of content consumption application 170 causes context sensing application 160 automatically become active and provide context sensing functionality or contextual data management functionality. Thus, in certain embodiments context sensing application 160 can be configured as a plugin that provides additional functionality to an existing content consumption application 170. In alternative embodiments context sensing application 160 and content consumption application 170 are separate components that do not interact with each other. Examples of content consumption applications which may be used in certain embodiments include Windows Media Player (Microsoft Corp., Redmond, Wash.), iTunes (Apple Inc., Cupertino, Calif.), and RealPlayer (RealNetworks, Inc., Seattle, Wash.).

Context sensing application 160 can be configured to work in conjunction with one or more sensors 162 capable of gathering information corresponding to the use context of device 100. In particular, context sensing application 160 and sensors 162 can be configured to generate a wide variety of contextual data, such as ambient light levels, ambient noise levels, geographic location, external temperature, physical movement, physical vibration, device processing capacity, device memory capacity, device battery characteristics including remaining battery power and battery drain rate, user eye focus tracking information, and operational characteristics of network 200 (including, for example, available bandwidth, network type, network power-bandwidth tradeoff data, and number of existing network connections being serviced). Other types of contextual data can be monitored and recorded in other embodiments. For example, in certain embodiments context sensing application 160 can be configured to manage and extract information contained within a user profile that describes user preferences with respect to content consumption context, such as a preference to avoid high bandwidth streaming using cellular data networks, a user-defined commute route across which battery life should be preserved, or a preference with respect to how content should be streamed within a certain portion of the user's residence.

Network 200 may be a local area network (such as a home-based or office network), a wide area network (such as the Internet), or a combination of such networks, whether public, private, or both. In general, communications amongst the various components described herein may occur via wired and/or wireless connections, such as may be provided by a wireless local area network (for example, a Wi-Fi network) or a mobile data network (for example, a cellular data network). As illustrated in FIG. 1, network 200 includes network hardware 210 used to transmit data from streaming media server 300 to computing device 100. The specific nature of network hardware 210 depends on the nature of network 200, but may include, for example, a wired or wireless router, an edge router, a home gateway, a hub, or a small cell. Other network hardware can be used in other embodiments. In some cases access to resources on a given network or computer system may require credentials such as usernames, passwords, and/or any other suitable security mechanism. Such functionality may be provided by network hardware 210, or may be provided by other network services not illustrated in FIG. 1.

Still referring to FIG. 1, streaming media server 300 can comprise one or more of a variety of server devices that are suitable for interaction with, and capable of streaming content to, computing device 100. Thus in certain embodiments server 300 comprises, for example, an array of enterprise class devices configured to provide video on demand to a large number of geographically distributed client devices. In other embodiments server 300 comprises a personal computer capable of providing digital media to devices connected to a home network. In one specific embodiment server 300 comprises a DASH server capable of partitioning media content into multiple segments that are encoded at different bit rates. In such case, server 300 can be configured to generate a media presentation description (MPD) file describing the various encodings available at server 300.

Regardless of its particular implementation, server 300 can be understood as including a processor 310, a media repository 320, and a communications adaptor 340. Processor 310 can be any suitable processor, and may include one or more coprocessors or controllers such as an audio processor or a GPU to assist in processing operations such as media transcoding and streaming. Media repository 320 can be implemented using any suitable type of digital storage capable of storing the content which is to be streamed by server 300. In some cases media repository 320 may be provided as a separate networked resource administered by a content provider, for example in the case where media server 300 is configured to provide real-time content streaming. Server 300 may also be configured to stream content obtained from multiple media repositories 320, some or all of which may be networked repositories. Communications adaptor 340 can be any suitable network chip or chipset which allows for wired and/or wireless communication with network 200 and any of the other components described herein.

The embodiments disclosed herein can be implemented in various forms of hardware, software, firmware, and/or special purpose processors. For example, in one embodiment a non-transitory computer readable medium has instructions encoded thereon that, when executed by one or more processors, cause one or more of the content streaming methodologies disclosed herein to be implemented. The instructions can be encoded using any suitable programming language, such as C, C++, object-oriented C, JavaScript, Visual Basic .NET, BASIC, or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example using JavaScript or another suitable browser-based technology. The functionalities disclosed herein can optionally be incorporated into other software applications, such as online content retail outlets, or can optionally leverage services provided by other software applications, such as content consumption applications. The computer software applications disclosed herein may include a number of different modules, sub-modules, or other components of distinct functionality, and can provide information to, or receive information from, still other components and/or services. These modules can be used, for example, to communicate with input and/or output devices such as a display screen, a touch sensitive surface, a printer and/or any other suitable input/output (I/O) device. Other components and functionality not reflected in the illustrations will be apparent in light of this disclosure, which is not intended to be limited to any particular hardware or software configuration. Thus in other embodiments computing device 100, streaming media server 300, and context adaptive DASH server 500 may comprise additional, fewer, or alternative subcomponents as compared to those included in the example embodiment illustrated in FIG. 1.

The aforementioned non-transitory computer readable medium may be any suitable medium for storing digital information, such as a hard drive, a server, a flash memory, and/or random access memory. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of embedded routines for carrying out the various functionalities disclosed herein. It will be apparent that any suitable combination of software, hardware, and firmware can be used, and that this disclosure is not intended to be limited to any particular system architecture.

Methodology and Data Pipelines

Figure 2B:
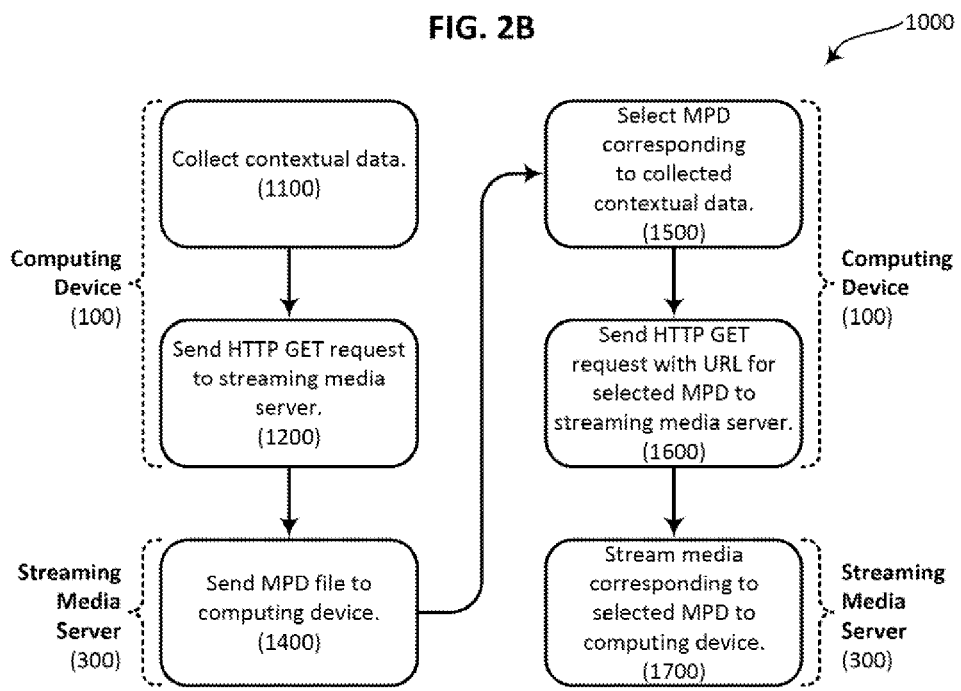
FIG. 2B is a flowchart illustrating a method for streaming digital content from a media server to a client computing device in a way that is tailored to the context in which the client computing device is used, in accordance with certain of the embodiments disclosed herein.

FIG. 2A is a data flow diagram schematically illustrating how digital content can be streamed from media server 300 to computing device 100 in a way that is tailored to the context in which computing device 100 is used. FIG. 2B is a flowchart illustrating a method 1000 for streaming digital content from media server 300 to computing device 100 in a way that is tailored to the context in which computing device 100 is used. As can be seen, method 1000 includes a number of phases and sub-processes, the sequence of which may vary from one embodiment to another. However, when considered in the aggregate, these phases and sub-processes form a complete context-aware digital content streaming process that is responsive to user commands in accordance with certain of the embodiments disclosed herein. These methodologies can be implemented, for example using the system architecture illustrated in FIG. 1 and described herein. However other system architectures can be used in other embodiments, as will be apparent in light of this disclosure. To this end, the correlation of the various data pipelines and functions shown in FIGS. 2A and 2B to the specific components illustrated in FIG. 1 is not intended to imply any structural and/or use limitations. Rather other embodiments may include, for example, varying degrees of integration where multiple functionalities are effectively performed by one system. For example, in an alternative embodiment a single module can be used to perform context sensing and content playback. Thus other embodiments may have fewer or more modules depending on the granularity of implementation. Numerous variations and alternative configurations will be apparent in light of this disclosure.

As illustrated in FIGS. 2A and 2B, method 1000 commences with collecting contextual data 164 using resources provided by computing device 100. See reference numeral 1100 in FIG. 2B. As described herein, a wide variety of contextual data 164 can be collected using, for example, one or more context sensing applications 160 running on computing device 100. Context sensing applications 160 are optionally configured to connect to, and gather contextual data 164 from, one or more sensors 162 which may be integrated into, or external to, computing device 100. For example, in one embodiment computing device 100 is configured to communicate with a wireless video sensor capable of monitoring a user's movements within or around a house, office, or other environment. The collected contextual data 164 can be cached in memory 120 such that it is available for use as described herein. Thus in some cases the cached contextual data 164 can be used to recognize use patterns that can in form the basis for tailoring the streaming of digital content in a way that uses network and/or device resources more efficiently.

Computing device 100 can be configured to initiate a request for content by sending a first HTTP GET request to streaming media server 300. See reference numeral 1200 in FIGS. 2A and 2B. This first GET request identifies the particular content which is to be retrieved, and may be generated in response to a specific user command, or may be automatically generated based on a predefined rule or other criterion. Upon receipt of the first GET request, streaming media server 300 can be configured to send an MPD file 322 to computing device 100. See reference numeral 1400 in FIGS. 2A and 2B. As described herein, MPD file 322 can be used to describe the various ways in which server 300 is configured to stream the content. For example, in an embodiment where media server 300 is capable of streaming content using a variety of different bitrates, MPD file 322 can include a description of the available bitrates. MPD file 322 can also include a unique network address or uniform resource locator (URL) corresponding to each of the content streams available from server 300. Thus MPD file 322 can be understood as a menu that provides a selection of the various ways particular content can be streamed from media server 300 to device 100.

Upon receipt of the MPD file 322, computing device 100 can be configured to select a particular MPD that corresponds to, or is otherwise believed to be best tailored to, collected contextual data 164. See reference numeral 1500 in FIG. 2B. For example, where contextual data 164 indicates that a user is watching video on a smartphone with a small display incapable of rendering high definition content, computing device 100 can be configured to request a lower bitrate from server 300 based on the selections presented in MPD file 322. As another example, where contextual data 164 indicates that a user is watching video in a dimly lit room, computing device 100 can be configured to request content with reduced pixel luminosity from server 300 based on the selections presented in MPD file 322. Where MPD file 322 does not include a content stream that exactly matches a content stream determined to be optimal for a given use context, computing device 100 can be configured to select a content stream that most closely corresponds to the optimal content stream. The logic used to make an appropriate MPD selection can be provided by context sensing application 160, content consumption application 170, or another module that forms part of computing device 100.

Once an appropriate MPD is selected, device 100 can be configured to send a second HTTP GET request to streaming media server 300 that includes a URL corresponding to the selected MPD. See reference numeral 1600 in FIGS. 2A and 2B. This specific URL, which corresponds to the particular MPD that was selected based on contextual data 164, enables client computing device 100 to manipulate how content is streamed from media server 300. Upon receiving the second GET request, streaming media server 300 streams media corresponding to the selected MPD to client computing device 100. See reference numeral 1700 in FIGS. 2A and 2B. This technique enables client device 100 to detect a particular use context and to influence how content is streamed from media server 300 based on the detected context. This advantageously allows for more efficient use of network and device resources by avoiding the streaming of high bitrate content to a user that is unable to fully leverage such content.

FIGS. 2A and 2B illustrate an example method 1000 in which client computing device 100 and streaming media server 300 directly interact with each other so as to provide streaming content that is tailored to a specific use context as detected by device 100. However in other embodiments context adaptive DASH server 500 can provide an interface between device 100 and server 300, as is illustrated in FIGS. 3A and 3B. In particular, FIG. 3A is a data flow diagram schematically illustrating how digital content can be streamed from media server 300, via context adaptive DASH server 500, to computing device 100 in a way that is tailored to the context in which the computing device 100 is used. FIG. 3B is a flowchart illustrating a method 2000 for streaming digital content from media server 300, via a context adaptive DASH server 500, to computing device 100 in a way that is tailored to the context in which the computing device 100 is used.

Method 2000 commences with collecting contextual data 164 using resources provided by or otherwise available to computing device 100. See reference numeral 2100 in FIG. 3B. A variety of contextual data 164 can be collected using a corresponding variety of techniques and sensors 162, as described herein. After at least some amount of contextual data 164 is collected, computing device 100 can be configured to initiate a request for content by sending a first HTTP GET request to streaming media sever 300. See reference numeral 2200 in FIGS. 3A and 3B. This first GET request identifies the particular content which is to be retrieved. Upon receipt of the first GET request, streaming media server 300 sends MPD file 322 to computing device 100. See reference numeral 2400 in FIGS. 3A and 3B. As described herein, MPD file 322 can be used to describe the various ways in which server 300 is configured to stream the content. While FIGS. 3A and 3B illustrate an embodiment wherein contextual data 164 is collected before the first GET request is sent to media server 300, in other embodiments contextual data 164 may not be collected until after the first GET request is sent, or even until after MPD file 322 is received. In still other embodiments, contextual data 164 is collected on a continual, periodic, or intermittent basis, and thus may continue to be collected after client device 100 begins communicating with media server 300.

Upon receipt of MPD file 322, computing device 100 can be configured to send a second HTTP GET request with a desired transcoding and a copy of the MPD file to context adaptive DASH server 500. See reference numeral 2600 in FIGS. 3A and 3B. The desired transcoding can be derived from the collected contextual data 164, and in certain embodiments corresponds to a media streaming technique that is configured to enable device and/or network resources to be consumed efficiently given a detected use context. For example, where contextual data 164 indicates that a user is watching video while using a device with a nearly exhausted battery, the desired transcoding may correspond to an audio stream instead of a video stream. As another example, where contextual data 164 indicates that a user is connected via a cellular data network, and that the user has expressed a preference to minimize data usage on such network, the desired transcoding may correspond to a standard definition video stream instead of a high definition video stream. In some cases the desired transcoding may specify a target bitrate that is preferred given a particular use context. The logic used to determine the desired transcoding can be provided by context sensing application 160, content consumption application 170, or another module that forms part of computing device 100.

Upon receiving MPD file 322 and the desired transcoding, context adaptive DASH server 500 can be configured to select an MPD approximating the desired transcoding. See reference numeral 2620 in FIG. 3B. This selection can be based on an evaluation of which of the available MPDs corresponds most appropriately to the desired transcoding. Context adaptive DASH server 500 can then be configured to send a third HTTP GET request to streaming media server 300 that includes a URL corresponding to the selected MPD. See reference numeral 2640 in FIGS. 3A and 3B. This specific URL, which corresponds to the particular MPD that was selected based on the desired transcoding, which was in turn established based on contextual data 164, enables client computing device 100 to manipulate how content is streamed from media server 300. Upon receiving the third GET request, streaming media server 300 streams media corresponding to the selected MPD to context adaptive DASH server 500. See reference numeral 2700 in FIGS. 3A and 3B.

In some embodiments context adaptive DASH server 500 can be configured to transcode the media received from server 300 based on the desired transcoding received from client device 100. See reference numeral 2720 in FIG. 3B. The transcoded media can then be streamed to client device 100. See reference numeral 2740 in FIGS. 3A and 3B. Such intermediate transcoding by DASH server 500 advantageously allows the content provided to client device 100 to more closely, or precisely, match the previously established desired transcoding. This may be particularly advantageous in applications where the desired transcoding does not closely correspond to one of the available MPDs. Intermediate transcoding by DASH server 500 also advantageously allows the content stream to be manipulated in ways for which media server 300 is not configured. For example, in one embodiment context adaptive DASH server 500 can be configured to adjust pixel luminosity based on a detected use content, even where media server 300 is unable to make such an adjustment. In an alternative embodiment, intermediate transcoding by DASH server 500 is only performed where none of the available MPDs is deemed to be appropriate for the applicable use context. In general, using context adaptive DASH server 500 advantageously allows additional functionality to be introduced into existing systems and enables content to be streamed in an existing client-server architecture in a way that is responsive to detected use contexts. In particular, context adaptive DASH server 500 enables computing device 100 to request content using conventional HTTP GET requests while enabling media server 300 to respond to such requests without any need to be responsive to the collected contextual data 164 upon which the streamed content is ultimately modified.

In alternative embodiments context adaptive DASH server 500 can be configured to pass the received media stream directly to client device 100 without transcoding or other modification. In still other embodiments client device 100 can be configured to send contextual data 164 directly to media server 300, which can be configured to generate MPD file 322 based on the received contextual data 164. This would increase the likelihood that MPD file 322 includes a transmission protocol that more closely or exactly matches a target transcoding. In such embodiments context adaptive DASH server 500 is optionally omitted. In general, however, context adaptive DASH server 500 can serve as an optional intermediate node for media server 300. Context adaptive DASH server 500 can be located, for example, within a home gateway for devices connected to a home network, in a small cell for devices connected to a cellular network, or at an edge router. Use of a context adaptive DASH server 500 enables certain of the embodiments disclosed herein to be used where server 300 is not configured for adaptive streaming services, in which case context adaptive DASH server 500 not only provides context-aware functionality, but HTTP adaptive transcoding functionality as well.

FIGS. 3A and 3B illustrate an example method 200 in which context adaptive DASH server 500 provides an interface between client device 100 and server 300. However in other embodiments such an interface can be provided by network hardware 210, as illustrated in FIGS. 4A and 4B. In particular, FIG. 4A is a data flow diagram schematically illustrating how the streaming of digital content from media server 300 to client computing device 100 can be tailored by intermediate network hardware 210 based on the context in which the client computing device 100 is used. FIG. 4B is a flowchart illustrating a method 3000 for using network hardware 210 to tailor the streaming of digital content from media server 300 to client computing device 100 based on the context in which the client computing device 100 is used. Configuring network hardware 210 to adapt to a sensed use context is particularly advantageous where a wireless base station, such as a wireless access point or a long term evolution (LTE) Evolved Node B (eNB) base station, streams content to multiple client devices simultaneously.

Method 3000 commences with collecting contextual data 164 using resources provided by or otherwise available to computing device 100. See reference numeral 3100 in FIG. 4B. A variety of contextual data 164 can be collected using a corresponding variety of techniques and sensors 162, as described herein. After at least some amount of contextual data 164 is collected, computing device 100 can be configured to send at least a portion of such data 164 to network hardware 210. See reference numeral 3150 in FIGS. 4A and 4B. For example, in one embodiment contextual data 164 is sent to a wireless network base station configured to stream digital content to multiple client devices simultaneously. In such embodiments the base station can be configured to associate the contextual data 164 with the particular client device 100 from which it was received, thereby enabling the base station to adjust subsequent data transmissions to device 100.

Computing device 100 can be configured to initiate a request for content by sending a first HTTP GET request to streaming media server 300. See reference numeral 3200 in FIGS. 4A and 4B. This first GET request identifies the particular content which is to be retrieved, and may be transmitted via the same network hardware 210 to which contextual data 164 was previously sent. Upon receipt of the first GET request, streaming media sever 300 sends MPD file 322 to computing device 100. See reference numeral 3400 in FIGS. 4A and 4B. As described herein, MPD file 322 can be used to describe the various ways in which server 300 is configured to stream the content. While FIGS. 4A and 4B illustrate an embodiment wherein contextual data 164 is collected and provided to network hardware 210 before the first GET request is sent to media server 300, in other embodiments contextual data 164 may not be collected until after the first GET request is sent, or even until after MPD file 322 is received. In still other embodiments, contextual data 164 is collected on a continual, periodic, or intermittent basis, and thus may continue to be collected after client device 100 begins communicating with media server 300.

Upon receipt of MPD file 322, computing device 100 can be configured to select a particular MPD that corresponds to, or is otherwise believed to be best tailored to, collected contextual data 164. See reference numeral 3500 in FIG. 4B. For example, where contextual data 164 indicates that a user is consuming audio content using a low fidelity headset, computing device 100 can be configured to request an audio stream that does not include 5.1 surround sound encoding based on the selections presented in MPD file 322. Where MPD file 322 does not include a content stream that exactly matches a content stream determined to be optimal for a given use context, computing device 100 can be configured to select a content stream that most closely corresponds to a theoretically optimal content stream. The logic used to make an appropriate MPD selection can be provided by context sensing application 160, content consumption application 170, or another module that forms part of computing device 100.

Once an appropriate MPD is selected, device 100 can be configured to send a second HTTP GET request to streaming media server 300 that includes a URL corresponding to the selected MPD. See reference numeral 3600 in FIGS. 4A and 4B. This specific URL, which corresponds to the particular MPD that was selected based on contextual data 164, enables client computing device 100 to manipulate how content is streamed from media server 300. The second GET request may be transmitted via the same network hardware 210 to which contextual data 164 was previously sent, thereby providing network hardware 210 with additional information with respect to the use context at client device 100. Upon receiving the second GET request, streaming media server 300 streams media corresponding to the selected MPD to network hardware 210. See reference numeral 3700 in FIGS. 4A and 4B. Network hardware 210 can be configured to allocate network resources in a way that allows such resources, as well as device resources associated with device 100, to be used more efficiently. See reference numeral 3720 in FIG. 4B. The logic used to make an appropriate resource allocation can be integrated into network hardware 210. Such allocation may be based on, for example, the previously received contextual data 162 and the content segment that device 100 selected from MPD file 322, as observed during network transmission of the second GET request. Once an appropriate context-based allocation of network resources has been established, network hardware 210 can be configured to stream the requested media to client device 100. See reference numeral 2740 in FIG. 4B.

Allocating network resources based on use context information advantageously enables such resources to be used more efficiently. For example, existing resource allocation techniques generally strive to allocate limited bandwidth capacity equally among concurrent connections. Such existing techniques may consider factors such as instantaneous signal-to-noise ratio values, packet delay, packet arrival/departure information, and client-side buffering, but are generally ignorant of other use context information, as descried herein. Given that many of the concurrent connections have different bandwidth requirements, equally allocating network resources often leaves some of the connections with insufficient bandwidth. However, by allocating less bandwidth to connections that do not need or are incapable of using additional bandwidth, such additional bandwidth resources can be allocated to those connections in need of such resources. Such a context-aware allocation of network resources is more likely to satisfy the bandwidth requirements of a larger portion of the concurrent connections. For example, in the context of a wireless base station streaming content to multiple mobile clients simultaneously, method 3000 enables network resources to be allocated based on the specific use context of each of the multiple mobile clients, thereby facilitating for a more efficient allocation of such resources. This is particularly useful within densely populated areas during peak use hours where a large number of client devices with different use contexts compete for limited downlink radio resources.

Example System

Figure 5:
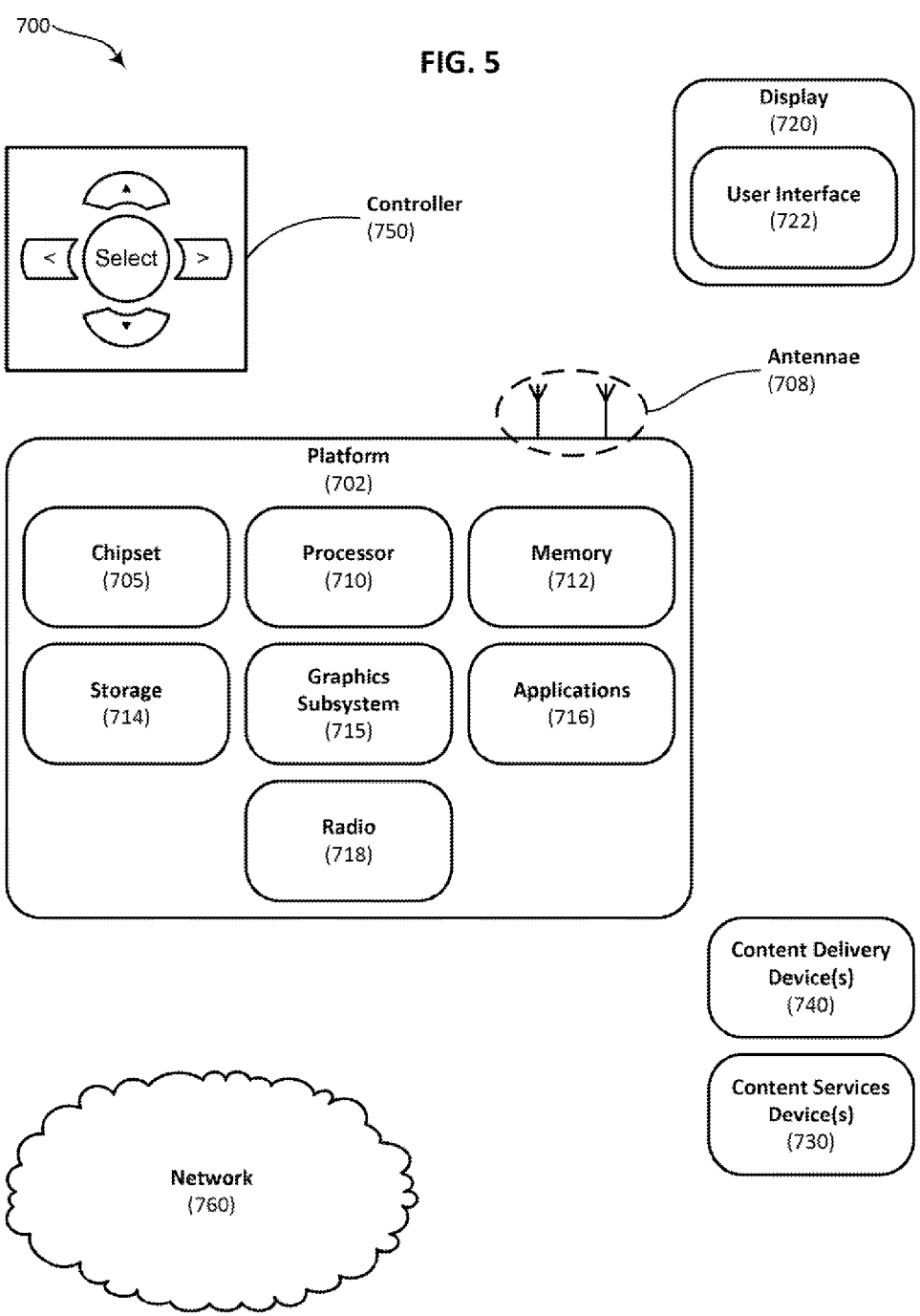
FIG. 5 is a block diagram schematically illustrating a media system configured in accordance with certain of the embodiments disclosed herein.
Figure 6:
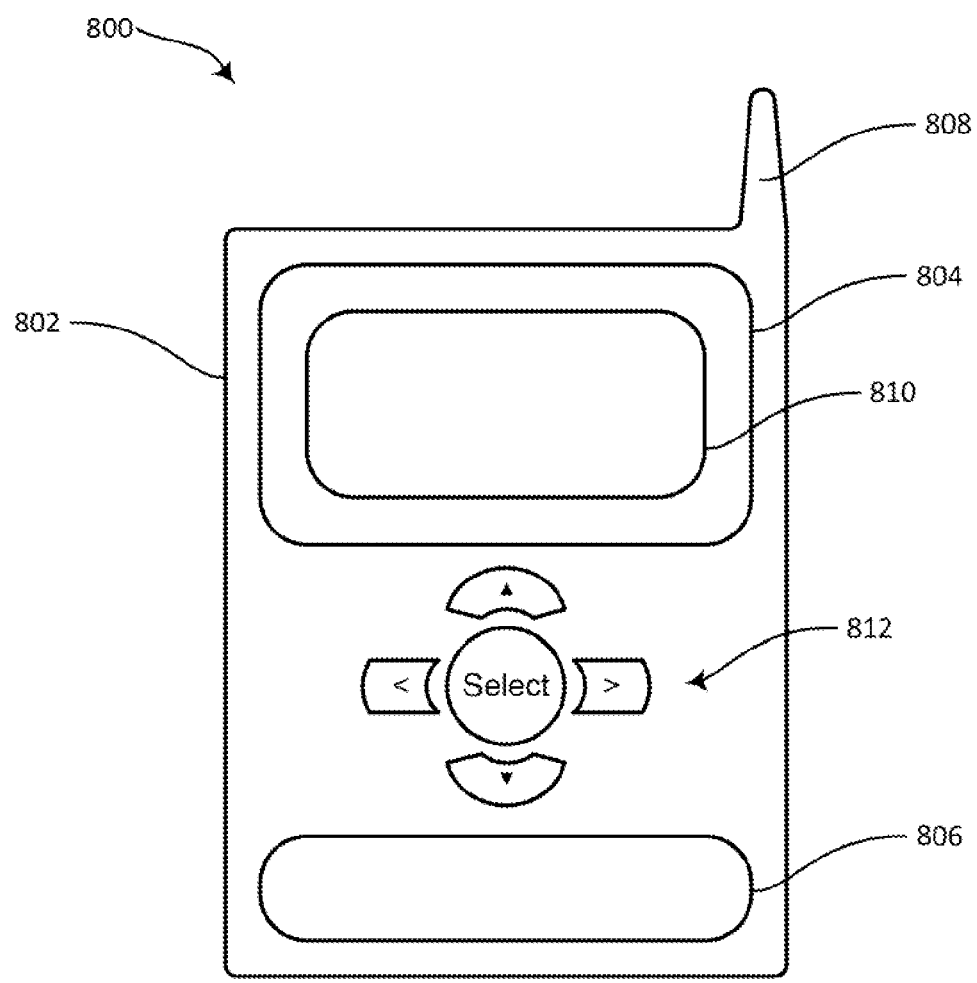
FIG. 6 is a block diagram schematically illustrating a mobile computing system configured in accordance with certain of the embodiments disclosed herein.

FIG. 5 illustrates an example system 700 that may carry out context-aware streaming of digital content as described herein. In some embodiments system 700 may be a media system although system 700 is not limited to this context. For example, system 700 may be incorporated into a personal computer (PC), laptop computer, ultra-laptop computer, tablet, touchpad, portable computer, handheld computer, palmtop computer, personal digital assistant (PDA), cellular telephone, combination cellular telephone and PDA, television, smart device (for example, smartphone, smart tablet or smart television), mobile internet device (MID), messaging device, data communication device, and so forth. In embodiments, system 700 comprises a platform 702 coupled to a display 720. Platform 702 may receive content form a content device such as content services device(s) 730 or content delivery device(s) 740 or other similar content sources. A navigation controller 750 comprising one or more navigation features may be used to interact with, for example, platform 702 and/or display 720. Each of these components is described in more detail in turn.

In embodiments, platform 702 may comprise any combination of a chipset 705, a processor 710, a memory 712, a storage 714, a graphics subsystem 715, applications 716, and/or a radio 718. Chipset 705 may provide intercommunication among processor 710, memory 712, storage 714, graphics subsystem 715, applications 716, and/or radio 718. For example, chipset 705 may include a storage adaptor (not illustrated) capable of providing intercommunication with storage 714. Processor 710 may be implemented as complex instruction set computer (CISC) or reduced instruction set computer (RISC) processors, x86 instruction set compatible processors, multicore, or any other microprocessor or central processing unit (CPU). In embodiments, processor 710 may comprise dual core processor(s), dual core mobile processor(s), and so forth. Memory 712 may be implemented as a volatile memory device such as, but not limited to, a RAM, dynamic RAM (DRAM), or static RAM (SRAM) device. Storage 714 may be implemented as a non-volatile storage device such as, but not limited to, a magnetic disk drive, optical disk drive, tape drive, an internal storage device, an attached storage device, flash memory, battery backed-up synchronous DRAM (SDRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a GPU or a visual processing unit (VPU), for example. An analog or digital interface may be used to communicatively couple graphics subsystem 715 and display 720. For example, the interface may be any of a high definition multimedia interface (HDMI), DisplayPort, wireless HDMI, and/or any other suitable interface using wireless high definition compliant techniques. Graphics subsystem 715 could be integrated into processor 710 or chipset 705. Graphics subsystem 715 could be a standalone card communicatively coupled to chipset 705. The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multicore processor. In a further embodiment, the functions may be implemented in a consumer electronics device.

Radio 718 may include one or more radios capable of transmitting and receiving signals using various suitable wireless communication techniques. Such techniques may involve communications across one or more wireless networks. Exemplary wireless networks include, but are not limited to, wireless local area networks, wireless personal area networks, wireless metropolitan area networks, cellular networks, and satellite networks. In communicating across such networks, radio 718 may operate in accordance with one or more applicable standards in any version.

In embodiments, display 720 may comprise any television type monitor or display. Display 702 may comprise, for example, a computer display screen, touchscreen display, video monitor, television-like device, and/or a television. Display 720 may be digital and/or analog. In embodiments, display 720 may be a holographic display. Also, display 720 may be a transparent or opaque surface that may receive a visual projection. Such projections may convey various forms of information, images, and/or objects. For example, such projections may be a visual overlay for a mobile augmented reality (MAR) application. Under the control of one or more software applications 716, platform 702 may display a user interface 722 on display 720.

In embodiments, content services device(s) 730 may be hosted by any national, international, and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (for example, by sending and/or receiving) media information to and from network 760. Content delivery device(s) 740 also may be coupled to platform 702 and/or to display 720. In embodiments, content services device(s) 730 may comprise a cable television box, personal computer, network, telephone, Internet enabled device or appliance capable of delivering digital information and/or content, and any other similar device capable of unidirectional or bidirectional communication of content between content providers and platform 702 and/or display 720, via network 760 or directly. It will be appreciated that the content may be communicated in a unidirectional and/or bidirectional manner to and from any one of the components in system 700 and a content provider via network 760. Examples of content may include any media information including, for example, video, music, medical and gaming information, and so forth. Content services device(s) 730 receive content such as cable television programming including media information, digital information, and/or other content. Examples of content providers may include any cable or satellite television or radio or Internet content providers. The provided examples are not meant to limit the disclosed embodiments.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (such as continuous and multidimensional) data into a computer. Many systems such as graphical user interfaces, televisions, and monitors allow the user to control and provide data to the computer or television using physical gestures. Movements of the navigation features of controller 750 may be echoed on a display, such as display 720, by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers, which are not illustrated for clarity, may comprise technology to enable users to instantly turn on and off platform 702 like a television with the touch of a button after initial boot up, when enabled, for example. Program logic may allow platform 702 to stream content to media adaptors or other content services device(s) 730 or content delivery device(s) 740 when the platform is turned "off". In addition, chipset 705 may comprise hardware and/or software support for 5.1 surround sound audio and/or high definition 7.1 surround sound audio, for example. Drivers may include a graphics driver for integrated graphics platforms. In embodiments, the graphics driver may comprise a Peripheral Component Interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated. In various embodiments, platform 702 and display 720 may be an integrated unit. Display 720 and content services device(s) 730 may be integrated, or display and content delivery device(s) 740 may be integrated, for example. These examples are not meant to limit the disclosed embodiments.

In various embodiments, system 700 may be implemented as a wireless system, a wired system, or a combination of both. When implemented as a wireless system, system 700 may include components and interfaces suitable for communicating over a wireless shared media, such as one or more antennae 708, transmitters, receivers, transceivers, amplifiers, filters, control logic, and so forth. An example of wireless shared media may include portions of a wireless spectrum, such as the radiofrequency spectrum and so forth. When implemented as a wired system, system 700 may include components and interfaces suitable for communicating over wired communications media, such as I/O adapters, physical connectors to connect the I/O adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Platform 702 may establish one or more logical or physical channels to communicate information. The information may include media information and control information. Media information may refer to any data representing content meant for a user. Examples of content may include, for example, data form a voice conversation, videoconference, streaming video, electronic mail ("email") messages, voice mail messages, alphanumeric symbols, graphics, image, video, text, and so forth. Data from a voice conversation may be, for example, speech information, silence periods, background noise, comfort noise, tones, and so forth. Control information may refer to any data representing commands, instructions or control words meant for an automated system. For example, control information may be used to route media information through a system, or instruct a node to process the media information in a predetermined manner.

The embodiments, however, are not limited to the elements or in the context shown or described in FIG. 7.

As described above, system 700 may be embodied in varying physical styles or form factors. FIG. 8 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example. As described herein, examples of a mobile computing device may include a PC, laptop computer, ultra-laptop computer, tablet, touchpad, portable computer, handheld computer, palmtop computer, PDA, cellular telephone, combination cellular telephone and PDA, television, smart device (for example, smartphone, smart tablet or smart television), MID, messaging device, data communication device, and so forth. Examples of a mobile computing device also may include computers that are arranged to be worn by a person such as a wrist computer, finger computer, ring computer, eyeglass computer, belt clip computer, armband computer, shoe computer, clothing computer, and other wearable computers. In embodiments, for example, a mobile computing device may be implemented as a smartphone capable of executing computer applications, as well as voice communications and/or data communications. Although some embodiments may be described with a mobile computer device implemented as smartphone by way of example, it may be appreciated that other embodies may be implemented using other wireless mobile computing devices as well. The embodiments are not limited in this context.

As shown in FIG. 8, device 800 may comprise a housing 802, a display 804, an I/O device 806, and an antenna 808. Device 800 also may comprise navigation features 812. Display 804 may comprise any suitable display unit for displaying information appropriate for a mobile computing device, such as a user interface 810. I/O device 806 may comprise any suitable I/O device for entering information into a mobile computing device. Examples for I/O device 806 may include an alphanumeric keyboard, a number keypad, a touchpad, input keys, buttons, switches, rocker switches, microphones, speakers, voice recognition devices, software, and so forth. Information also may be entered into device 800 by way of microphone. Such information may be digitized by a voice recognition device or service. The embodiments are not limited in this context.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled", however, may also mean that two or more elements are not in direct contact with each other, but yet still cooperate or interact with each other.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing", "computing", "calculating", "determining", or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a method for streaming digital content to a client device. The method comprises receiving, by an intermediate server from a client device, a first HTTP GET request corresponding to digital content hosted by a media server, a desired transmission methodology corresponding to a use context of the client device, and a listing comprising a plurality of available transmission methodologies. The method further comprises making a selection of one of the plurality of available transmission methodologies from the listing, the selection being made based on the desired transmission methodology. The method further comprises sending a second HTTP GET request to the media server, the second HTTP GET request including a network address corresponding to the selected one of the plurality of available transmission methodologies. The method further comprises receiving the digital content from the media server, the digital content being transmitted in response to the second HTTP GET request. The method further comprises forwarding the received digital content to the client device.

Example 2 includes the subject matter of Example 1, wherein the intermediate server is a context adaptive dynamic adaptive streaming over HTTP (DASH) server.

Example 3 includes the subject matter of Example 1, wherein the desired transmission methodology corresponds to a reduced bandwidth with respect to a bandwidth capacity associated with a network connection between the media server and the client device.

Example 4 includes the subject matter of Example 1, wherein forwarding the received digital content to the client device includes modifying transcoding of the received digital content.

Example 5 is a method for receiving content at a client device. The method comprises detecting a use context of a client device, the use context being characterized by contextual data. The method further comprises sending a first HTTP GET request to a media server, the HTTP GET request identifying sought content. The method further comprises receiving, from the media server, a listing comprising a plurality of available transmission methodologies associated with the sought content. The method further comprises making a selection of one of the plurality of available transmission methodologies from the listing, the selection being made based on the contextual data. The method further comprises sending a second HTTP GET request to the media server, the second HTTP GET request including a network address corresponding to the selected one of the plurality of available transmission methodologies. The method further comprises receiving the sought content from the media server, the sought content being transmitted in response to the second HTTP GET request.

Example 6 includes the subject matter of Example 5, wherein the selection corresponds to a reduced bandwidth with respect to a bandwidth capacity associated with a network connection between the media server and the client device.

Example 7 includes the subject matter of Example 5, wherein detecting the use context of the client device comprises gathering data from an environmental sensor selected from a group consisting of an ambient light sensor, a microphone, and an accelerometer.

Example 8 includes the subject matter of Example 5, further comprising forwarding the sought content to the client device after modifying transcoding of the received sought content.

Example 9 is a method of streaming content over a network. The method comprises receiving contextual data from a client device, the contextual data characterizing a use context of a client device. The method further comprises transmitting a first HTTP GET request passing from the client device to a media server, the first HTTP GET request identifying sought content. The method further comprises transmitting a listing comprising a plurality of available transmission methodologies associated with the sought content, the listing passing from the media server to the client device. The method further comprises transmitting a second HTTP GET request passing from the client device to the media server. The method further comprises receiving the sought content from the media server in response to the second HTTP GET request, the sought content being transmitted according to a selected one of the plurality of available transmission methodologies included in the listing. The method further comprises transmitting the sought content to the client device according to a modified transmission methodology that is based on the contextual data.

Example 10 includes the subject matter of Example 9, wherein an edge router is used to receive the sought content from the media server and transmit the sought content to the client device according to the modified transmission methodology.

Example 11 includes the subject matter of Example 9, wherein the selected transmission methodology corresponds to a reduced bandwidth with respect to a bandwidth capacity associated with a network connection between the media server and the client device.

Example 12 includes the subject matter of Examples 1, 5, or 9, wherein the use context is selected from a group consisting of a battery level associated with the client device, a display resolution associated with the client device, and a processor capacity associated with the client device.

Example 13 includes the subject matter of Examples 1, 5, or 9, wherein the use context is dependent on a user profile associated with a user of the client device.

Example 14 includes the subject matter of Examples 1, 5, or 9, wherein the listing of available transmission methodologies is provided in the form of a media presentation description (MPD) file.

Example 15 includes the subject matter of Examples 1, 5, or 9, wherein the listing includes a network address corresponding to each of the plurality of available transmission methodologies.

Example 16 is a non-transitory computer readable medium having instructions encoded thereon that, when executed by one or more processors, cause a context-aware content streaming process to be carried out. The process comprises receiving, by an intermediate server from a client device, a first HTTP GET request corresponding to digital content hosted by a media server, a desired transmission methodology corresponding to a use context of the client device, and a listing comprising a plurality of available transmission methodologies. The process further comprises making a selection of one of the plurality of available transmission methodologies from the listing, the selection being made based on the desired transmission methodology. The process further comprises sending a second HTTP GET request to the media server, the second HTTP GET request including a network address corresponding to the selected one of the plurality of available transmission methodologies.

The process further comprises receiving the digital content from the media server, the digital content being transmitted in response to the second HTTP GET request. The process further comprises forwarding the received digital content to the client device.

Example 17 includes the subject matter of Example 16, wherein forwarding the received digital content to the client device includes modifying transcoding of the received digital content.

Example 18 includes the subject matter of Example 16, wherein the intermediate server is a context adaptive dynamic adaptive streaming over HTTP (DASH) server.

Example 19 includes the subject matter of Example 16, wherein the desired transmission methodology corresponds to a reduced bandwidth with respect to a bandwidth capacity associated with a network connection between the media server and the client device.

Example 20 is a non-transitory computer readable medium having instructions encoded thereon that, when executed by one or more processors, cause a context-aware content streaming process to be carried out. The process comprises detecting a use context of a client device, the use context being characterized by contextual data. The process further comprises sending a first HTTP GET request to a media server, the HTTP GET request identifying sought content. The process further comprises receiving, from the media server, a listing comprising a plurality of available transmission methodologies associated with the sought content. The process further comprises making a selection of one of the plurality of available transmission methodologies from the listing, the selection being made based on the contextual data. The process further comprises sending a second HTTP GET request to the media server, the second HTTP GET request including a network address corresponding to the selected one of the plurality of available transmission methodologies. The process further comprises receiving the sought content from the media server, the sought content being transmitted in response to the second HTTP GET request.

Example 21 includes the subject matter of Example 20, wherein the selection corresponds to a reduced bandwidth with respect to a bandwidth capacity associated with a network connection between the media server and the client device.

Example 22 includes the subject matter of Example 20, wherein detecting the use context of the client device comprises gathering data from an environmental sensor selected from a group consisting of an ambient light sensor, a microphone, and an accelerometer.

Example 23 includes the subject matter of Example 20, further comprising forwarding the sought content to the client device after modifying transcoding of the received sought content.

Example 24 is a non-transitory computer readable medium having instructions encoded thereon that, when executed by one or more processors, cause a context-aware content transmission process to be carried out. The process comprises receiving contextual data from a client device, the contextual data characterizing a use context of a client device. The process further comprises transmitting a first HTTP GET request passing from the client device to a media server, the first HTTP GET request identifying sought content. The process further comprises transmitting a listing comprising a plurality of available transmission methodologies associated with the sought content, the listing passing from the media server to the client device. The process further comprises transmitting a second HTTP GET request passing from the client device to the media server. The process further comprises receiving the sought content from the media server in response to the second HTTP GET request, the sought content being transmitted according to a selected one of the plurality of available transmission methodologies included in the listing. The process further comprises transmitting the sought content to the client device according to a modified transmission methodology that is based on the contextual data.

Example 25 includes the subject matter of Example 24, wherein an edge router is used to receive the sought content from the media server and transmit the sought content to the client device according to the modified transmission methodology.

Example 26 includes the subject matter of Example 24, wherein the selected transmission methodology corresponds to a reduced bandwidth with respect to a bandwidth capacity associated with a network connection between the media server and the client device.

Example 27 includes the subject matter of Examples 16, 20, or 24, wherein the use context is selected from a group consisting of a battery level associated with the client device, a display resolution associated with the client device, and a processor capacity associated with the client device.

Example 28 includes the subject matter of Examples 16, 20, or 24, wherein the use context is dependent on a user profile associated with a user of the client device.

Example 29 includes the subject matter of Examples 16, 20, or 24, wherein the listing of available transmission methodologies is provided in the form of a media presentation description (MPD) file.

Example 30 includes the subject matter of Examples 16, 20, or 24, wherein the listing includes a network address corresponding to each of the plurality of available transmission methodologies.

Example 31 is a system for context-aware streaming of digital content. The system comprises a context sensing application configured to detect a use context of a mobile computing device and generate contextual data corresponding to the detected use context. The system further comprises a context adaptive media server configured to (a) receive the generated contextual data and a listing comprising a plurality of available transmission methodologies associated with digital content and (b) generate an HTTP GET request corresponding to a selected one of the plurality of available transmission methodologies, wherein the selected transmission methodology is chosen based on the generated contextual data. The system further comprises a transcoding module configured to receive the digital content having been sent in response to the HTTP GET request and retransmit the digital content according to a modified transmission methodology that is selected based on the generated contextual data.

Example 32 includes the subject matter of Example 31, wherein the selected transmission methodology corresponds to a reduced bandwidth with respect to a bandwidth capacity associated with a network connection between the mobile computing device and the context adaptive media server.

Example 33 includes the subject matter of Example 31, wherein the use context is selected from a group consisting of a battery level associated with the mobile computing device, a display resolution associated with the mobile computing device, and a processor capacity associated with the mobile computing device.

Example 34 includes the subject matter of Example 31, wherein the use context is dependent on a user profile associated with a user of the mobile computing device.

Example 35 includes the subject matter of Example 31, wherein the listing of available transmission methodologies is provided in the form of a media presentation description (MPD) file.

Example 36 includes the subject matter of Example 31, wherein the listing includes a network address corresponding to each of the plurality of available transmission methodologies The foregoing description of example embodiments is presented for the purposes of illustration and description. It is not intended to be exhaustive or to limit this disclosure to the precise forms described. Many modifications and variations are possible in light of this disclosure. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A method for streaming digital content to a client device, the method comprising:
    transmitting, by an intermediate server, a first HTTP GET request passing from a client device to a media server, the first HTTP GET request identifying a particular content segment that forms part of a digital content item that is hosted by the media server;
    transmitting, by the intermediate server, a listing comprising a plurality of available transmission methodologies associated with the particular content segment, the listing originating at the media server and being transmitted to the client device;
    receiving, by the intermediate server from the client device, a second HTTP GET request that identifies the same particular content segment, identifies a desired transmission methodology corresponding to a use context of the client device, and includes the listing of available transmission methodologies;
    making a selection, by the intermediate server, of a first one of the plurality of available transmission methodologies from the listing, the selection being made based on the desired transmission methodology;
    sending a third HTTP GET request from the intermediate server to the media server, the third HTTP GET request including a network address corresponding to the first transmission methodology;
    receiving, by the intermediate server from the media server, the particular content segment that was identified in the first and second HTTP GET requests, wherein the particular content segment is transmitted from the media server (a) in response to the third HTTP GET request, and (b) according to the first transmission methodology; and
    forwarding the received particular content segment from the intermediate server to the client device according to a second transmission methodology that is different from the first transmission methodology,
    wherein the particular content segment is transmitted from the media server to the intermediate server according to the first transmission methodology, and wherein the same particular content segment is transmitted from the intermediate server to the client device according to the second transmission methodology, such that the same particular content segment is transmitted according to two different transmission methodologies in passing from the media server to the client device; and
    wherein the use context is characterized by contextual data generated by a context sensing application that extracts a content consumption preference contained within a user profile, and further obtains sensing data from one or more sensors associated with the client device.

2. The method of claim 1, wherein the intermediate server is a context adaptive dynamic adaptive streaming over HTTP (DASH) server.

3. The method of claim 1, wherein the desired transmission methodology corresponds to a reduced bandwidth with respect to a bandwidth capacity associated with a network connection between the media server and the client device.

4. The method of claim 1, wherein forwarding the received particular content segment to the client device includes modifying transcoding of the received particular content segment.

5. The method of claim 1, wherein the use context is selected from a group consisting of a battery level associated with the client device, a display resolution associated with the client device, and a processor capacity associated with the client device.

6. A method of streaming content over a network, the method comprising:
    receiving, by an intermediate server, contextual data that is transmitted from a client device, the contextual data characterizing a use context of the client device, wherein the contextual data is generated by a context sensing application that extracts a content consumption preference contained within a user profile, and further obtains sensing data from one or more sensors associated with the client device;
    transmitting, by the intermediate server, a first HTTP GET request passing from the client device to a media server, the first HTTP GET request identifying a particular content segment that forms part of a digital content item;
    transmitting, by the intermediate server, a listing comprising a plurality of available transmission methodologies associated with the particular content segment, the listing originating at the media server and being transmitted to the client device in response to the first HTTP GET request;
    transmitting, by the intermediate server, a second HTTP GET request passing from the client device to the media server, the first and second HTTP GET requests identifying the same particular content segment, wherein the second HTTP GET request further identifies a particular one of the plurality of available transmission methodologies included in the listing;
    receiving, by the intermediate server from the media server, the particular content segment that was identified in the first and second HTTP GET requests, wherein the particular content segment is transmitted from the media server as a result of the second HTTP GET request having been processed by the media server, the particular content segment being transmitted according to the particular one of the plurality of available transmission methodologies included in the listing; and
    transmitting the particular content segment from the intermediate server to the client device according to a modified transmission methodology that is based on the contextual data, and that is different from the particular transmission methodology used to transmit the same particular content segment from the media server to the intermediate server, wherein the same particular content segment is transmitted according to two different transmission methodologies in passing from the media server to the client device.

7. The method of claim 6, wherein the intermediate server includes an edge router that is used to receive the particular content segment from the media server and transmit the particular content segment to the client device according to the modified transmission methodology.

8. The method of claim 6, wherein the particular transmission methodology corresponds to a reduced bandwidth with respect to a bandwidth capacity associated with a network connection between the media server and the client device.

9. The method of claim 6, wherein the listing of available transmission methodologies is provided as a media presentation description (MPD) file.

10. The method of claim 6, wherein the listing includes a network address corresponding to each of the plurality of available transmission methodologies.

11. A non-transitory computer readable medium having instructions encoded thereon that, when executed by one or more processors, cause a context-aware content streaming process to be carried out, the process comprising:

detecting a use context of a client device, the use context being characterized by contextual data generated by a context sensing application that extracts a content consumption preference contained within a user profile, and further obtains sensing data from one or more sensors associated with the client device;

sending a first HTTP GET request from the client device to a media server, the first HTTP GET request identifying a particular segment of a digital content item that is hosted by the media server, wherein the digital content item comprises a plurality of segments;

receiving, from the media server, a listing comprising a plurality of available transmission methodologies associated with the particular segment of the digital content item, the listing being transmitted from the media server in response to the first HTTP GET request;

making a selection of a particular one of the plurality of available transmission methodologies from the listing, the selection being made based on the contextual data;

sending a second HTTP GET request from the client device to the media server, the second HTTP GET request including a network address corresponding to the particular one of the plurality of available transmission methodologies, wherein the second HTTP GET request identifies the same particular segment of the digital content item as was identified in the first HTTP GET request; and receiving the particular segment of the digital content item from the media server, the particular segment being transmitted from the media server in response to the second HTTP GET request, and the particular segment being that which was identified in both the first and second HTTP GET requests, wherein multiple HTTP GET requests identifying the same particular segment of the digital content item are sent from the client device to the media server before the particular segment is received from the media server.

12. The non-transitory computer readable medium of claim 11, wherein the selection corresponds to a reduced bandwidth with respect to a bandwidth capacity associated with a network connection between the media server and the client device.

13. The non-transitory computer readable medium of claim 11, wherein the one or more sensors comprises an environmental sensor selected from a group consisting of an ambient light sensor, a microphone, and an accelerometer.

14. The non-transitory computer readable medium of claim 11, the context-aware streaming process further comprising forwarding the particular segment of the digital content item to the client device after modifying transcoding of the particular segment.

15. The non-transitory computer readable medium of claim 11, wherein the use context is selected from a group consisting of a battery level associated with the client device, a display resolution associated with the client device, and a processor capacity associated with the client device.

16. The non-transitory computer readable medium of claim 11, wherein the listing of available transmission methodologies is provided as a media presentation description (MPD) file.

17. The non-transitory computer readable medium of claim 11, wherein the listing includes a network address corresponding to each of the plurality of available transmission methodologies.

18. A system for context-aware streaming of digital content, the system comprising:

a context sensing application configured to detect a use context of a mobile computing device and generate contextual data corresponding to the detected use context, wherein the context sensing application extracts a content consumption preference contained within a user profile, and further obtains sensing data from one or more sensors associated with the mobile computing device;

a context adaptive media server configured to
(a) transmit a first HTTP GET request passing from the mobile computing device to a streaming media server, the first HTTP GET request identifying a particular content segment that forms part of a content item that is hosted by the streaming media server,
(b) transmit a listing comprising a plurality of available transmission methodologies associated with the particular content segment, the listing originating at the streaming media server and being transmitted to the mobile computing device,
(c) receive, from the mobile computing device, a second HTTP GET request that identifies the same particular content segment, identifies a desired transmission methodology corresponding to the use contest, and includes the listing of available transmission methodologies, and
(d) send a third HTTP GET request to the streaming media server, the third HTTP GET request including a network address corresponding to a selected one of the plurality of available transmission methodologies, wherein the selected transmission methodology is chosen based on the generated contextual data; and a transcoding module that forms part of the context adaptive media server, wherein the transcoding module is configured to (a) receive a transmission of the particular content segment that was identified in the first and second HTTP GET requests, and that is sent from the streaming media server in response to the third HTTP GET request and in accordance with the selected transmission methodology, and (b) retransmit the particular content segment to the mobile computing device according to a modified transmission methodology that is selected based on the generated contextual data, and that is different from the selected transmission methodology, wherein the same particular content segment is transmitted according to two different transmission methodologies in passing from the streaming media server to the mobile computing device.

19. The system of claim 18, wherein the selected transmission methodology corresponds to a reduced bandwidth with respect to a bandwidth capacity associated with a network connection between the mobile computing device and the context adaptive media server.

20. The system of claim 18, wherein the use context is selected from a group consisting of a battery level associated with the mobile computing device, a display resolution associated with the mobile computing device, and a processor capacity associated with the mobile computing device.

21. The system of claim 18, wherein the listing of available transmission methodologies is provided as a media presentation description (MPD) file.

22. The system of claim 18, wherein the listing includes a network address corresponding to each of the plurality of available transmission methodologies.

23. A non-transitory computer readable medium having instructions encoded thereon that, when executed by one or more processors, cause a context-aware content streaming process to be carried out, the process comprising:

transmitting, by an intermediate server, a first HTTP GET request passing from a client device to a media server, the first HTTP GET request identifying a particular content segment that forms part of a digital content item that is hosted by the media server;

transmitting, by the intermediate server, a listing comprising a plurality of available transmission methodologies associated with the particular content segment, the listing originating at the media server and being transmitted to the client device;

receiving, by the intermediate server from the client device, a second HTTP GET request that identifies the same particular content segment, identifies a desired transmission methodology corresponding to a use context of the client device, and includes the listing of available transmission methodologies;

making a selection, by the intermediate server, of a first one of the plurality of available transmission methodologies from the listing, the selection being made based on the desired transmission methodology;

sending a third HTTP GET request from the intermediate server to the media server, the third HTTP GET request including a network address corresponding to the first transmission methodology;

receiving, by the intermediate server from the media server, the particular content segment that was identified in the first and second HTTP GET requests, wherein the particular digital content segment is transmitted from the media server (a) in response to the third HTTP GET request, and (b) according to the first transmission methodology; and forwarding the received particular content segment from the intermediate server to the client device according to a second transmission methodology that is different from the first transmission methodology, wherein the particular content segment is transmitted from the media server to the intermediate server according to the first transmission methodology, and wherein the same particular content segment is transmitted from the intermediate server to the client device according to the second transmission methodology, such that the same particular content segment is transmitted according to two different transmission methodologies in passing from the media server to the client device; and wherein the use context is characterized by contextual data generated by a context sensing application that extracts a content consumption preference contained within a user profile, and further obtains sensing data from one or more sensors associated with the client device.

24. A non-transitory computer readable medium having instructions encoded thereon that, when executed by one or more processors, cause a context-aware content streaming process to be carried out, the process comprising:

receiving, by an intermediate server, contextual data that is transmitted from a client device, the contextual data characterizing a use context of the client device, wherein the contextual data is generated by a context sensing application that extracts a content consumption preference contained within a user profile, and further obtains sensing data from one or more sensors associated with the client device;

transmitting, by the intermediate server, a first HTTP GET request passing from the client device to a media server, the first HTTP GET request identifying a particular content segment that forms part of a digital content item;

transmitting, by the intermediate server, a listing comprising a plurality of available transmission methodologies associated with the particular content segment, the listing originating at the media server and being transmitted to the client device in response to the first HTTP GET request;

transmitting, by the intermediate server, a second HTTP GET request passing from the client device to the media server, the first and second HTTP GET requests identifying the same particular content segment, wherein the second HTTP request further identifies a particular one of the plurality of available transmission methodologies included in the listing;

receiving, by the intermediate server from the media server, the particular content segment that was identified in the first and second HTTP GET requests, wherein the particular content segment is transmitted from the media server as a result of the second HTTP GET request having been processed by the media server, the particular content segment being transmitted according to the particular one of the plurality of available transmission methodologies included in the listing; and transmitting the particular content segment from the intermediate server to the client device according to a modified transmission methodology that is based on the contextual data, and that is different from the particular transmission methodology used to transmit the same particular content segment from the media server to the intermediate server, wherein the same particular content segment is transmitted according to two different transmission methodologies in passing from the media server to the client device.

* * * * *